(12) United States Patent
McVeen et al.

(10) Patent No.: US 12,728,810 B2
(45) Date of Patent: Sep. 8, 2026

(54) DYNAMICALLY ADJUSTABLE COMPLIANT LAP RESTRAINT DEVICE

(71) Applicant: Universal City Studios LLC, Universal City, CA (US)

(72) Inventors: Keith Michael McVeen, Winter Garden, FL (US); Gregory Paul Habiak, Orlando, FL (US); David Gerard Majdali, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 453 days.

(21) Appl. No.: 18/216,997

(22) Filed: Jun. 30, 2023

(65) Prior Publication Data

US 2025/0001962 A1 Jan. 2, 2025

(51) Int. Cl.
*B60R 21/02* (2006.01)
*B60R 21/00* (2006.01)

(52) U.S. Cl.
CPC ...... *B60R 21/02* (2013.01); *B60R 2021/0097* (2013.01); *B60R 2021/0206* (2013.01)

(58) Field of Classification Search
CPC ............ B60R 21/02; B60R 2021/0097; B60R 2021/0206; B60R 21/055
See application file for complete search history.

(56) References Cited

U.S. PATENT DOCUMENTS 3,901,550 A * 8/1975 Hamy ..................... B60R 21/02 297/488
4,637,629 A * 1/1987 Cummings ........... B64D 25/06 280/801.1
6,234,525 B1 * 5/2001 Schroder ................. B60R 21/02 297/487
RE37,466 E * 12/2001 Allen .................. B60N 2/0031 280/735
6,513,441 B1 * 2/2003 Clerx ...................... B60R 21/02 104/53
6,728,616 B1 * 4/2004 Tabe ..................... B60R 21/017 296/68.1

(Continued)

FOREIGN PATENT DOCUMENTS

WO 1999012012 A1 3/1999

OTHER PUBLICATIONS

"Are Seat Belt necessary?" ; 7 pages ; https://coasterbuzz.com/Forums/Topic/are-seat-belt-necessary (Year: 2001).*

(Continued)

*Primary Examiner* — David R Dunn
(74) *Attorney, Agent, or Firm* — Fletcher Yoder, P.C.

(57) ABSTRACT

A restraint system is used to provide a dynamically adjustable compliance for an occupant in a ride system. The restraint system includes a strap with adjustable extension length to wrap around the occupant. A tension on the strap is measured and used to adjust the length of the strap to provide different restraint levels. The restraint level is associated with the condition of the occupant (e.g., height, weight, age, shape, size), a property of the ride system (e.g., configuration of the ride vehicle), an operating parameter of the ride vehicle (e.g., velocity, acceleration, moving direction), a feature of the environment that the ride vehicle rides in, or any combination thereof.

27 Claims, 8 Drawing Sheets

(56) References Cited

U.S. PATENT DOCUMENTS 6,733,398 B1 * 5/2004 Clerx .................... B60R 22/14 472/133
6,868,745 B2 * 3/2005 Sullivan ............ B60R 21/01546 73/862.391
6,959,779 B2 * 11/2005 Curtis .................... B60R 22/12 180/268
7,241,093 B2 * 7/2007 Zuniga .................. B60P 7/0823 410/97
7,347,108 B2 * 3/2008 Kaijala ............... B60R 21/0155 73/862.391
7,426,429 B2 * 9/2008 Tabe ...................... B60R 22/48 701/45
7,677,671 B2 * 3/2010 Steininger ............... B60R 21/02 297/487
7,695,070 B2 * 4/2010 Muller .................... B60R 21/02 297/487
7,712,776 B2 * 5/2010 Prakah-Asante ........................... B60R 21/01512 280/735
7,975,562 B2 * 7/2011 Skarpil ................... B60R 22/30 73/862.453
8,386,119 B2 * 2/2013 Kobayashi ............. B60G 17/08 340/576
8,840,184 B2 * 9/2014 Szakelyhidi ........... B60N 2/274 297/256.13
9,533,651 B1 * 1/2017 Ohno ..................... B60N 2/914
9,744,930 B2 * 8/2017 Howard .................. B60R 21/02
10,336,277 B2 * 7/2019 Kubiak .................... A63G 7/00
2004/0017073 A1 * 1/2004 Pavlov ................. B60N 2/0027 280/806
2008/0143158 A1 * 6/2008 Roodenburg ............ A63G 7/00 297/484
2010/0307288 A1 * 12/2010 Lubman .................. B60R 21/02 74/577 M
2015/0328067 A1 * 11/2015 Girardin ................. B60R 22/20 410/7
2016/0304004 A1 * 10/2016 Sandbothe ........... B60N 2/2821
2017/0144774 A1 * 5/2017 Pollard ................ B64D 11/062
2018/0020984 A1 * 1/2018 Hall ....................... A61B 5/318 600/301
2019/0184935 A1 * 6/2019 Blum ....................... A63G 7/00
2020/0346566 A1 * 11/2020 Frank ................... B60N 2/2824
2025/0001962 A1 * 1/2025 McVeen .................. B60R 21/02

OTHER PUBLICATIONS

PCT/US2024/030090 International Search Report and Written Opinion mailed Aug. 23, 2024.

Amusement Today, "Banshee trains arrive at Kings Island," Feb. 5, 2014, retrieved from: https://amusementtoday.com/2014/02/banshee-trains-arrive-at-kings-island/, 3 pages.

Klinich, et al., "A Literature Review of Wheelchair Transportation Safety Relevant to Automated Vehicles," Int. J. Environ. Res. Public Health 2022, 19(3), 1633; https://doi.org/10.3390/ijerph19031633.

Veoneer, "Restraint Control Systems," accessed on Oct. 27, 2023, https://www.veoneer.com/en/restraint-control-systems.

Q'Straint, "Quantum Automatic Wheelchair Securement Station," accessed on Oct. 27, 2023, https://www.qstraint.com/quantum/.

Simxperience, "G-Belt Dual Axis Active Seat Belt Tensioning System," accessed on Oct. 27, 2023, https://www.simxperience.com/shop/sx-sbt-001-g-belt-dual-axis-active-seat-belt-tensioning-system-712#attr=.

* cited by examiner

DYNAMICALLY ADJUSTABLE COMPLIANT LAP RESTRAINT DEVICE

BACKGROUND

The present disclosure relates generally to the field of amusement parks. More specifically, embodiments of the present disclosure relate to systems and methods for securing guests inside a ride vehicle of an amusement park ride.

Amusement parks typically include various attractions that provide unique experiences for guests. For example, an amusement park may include various rides and show performances. As technology has continued to improve, such attractions have increased in sophistication and complexity. For instance, certain rides may provide an immersive experience for the guest, e.g., a series of vehicles may drive riders through rooms with various features, including audio, video, and special effects features. Various amusement park rides have been created to provide riders with unique motion and visual experiences. For example, theme rides can be implemented with single-rider or multi-rider vehicles that travel along a path or that utilize a motion base. Excitement is often created by the speed or change in direction of the vehicles as they move along a ride path or follow a motion routine. For example, the ride path may include a number of features such as, but not limited to, tunnels, turns, ascents, descents loops, and so forth. While the riders are inside the operating ride, they may be subject to forces while the ride is in operation. Accordingly, it is desirable to restrain and secure riders within the ride vehicle for the duration of the amusement park ride. Different features along the ride path may require different restraint levels, and riders may have different conditions (e.g., physical conditions, height, weight, shape, size). Accordingly, it is now recognized that improved restraint devices with variability are desirable.

In addition, it is now recognized that a group of riders (e.g., members of a family with larger guests and smaller guests (e.g., young children)) with various conditions (e.g., height, weight, shape, size) may take a multi-rider vehicle together and desire to be restrained with a common restraint device. Accordingly, it is desirable to have an improved restraint device to accommodate such an arrangement.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a restraint system for a ride vehicle for providing a dynamically adjustable compliance is provided in accordance with the present disclosure. The restraint system includes a lap bar assembly having a pronged lap bar structure. The lap bar assembly is configured to transition between an open configuration and an engaged configuration. In the open configuration, the pronged lap bar structure is positioned further away from seating of the ride vehicle than in the engaged configuration. A first prong and a second prong of the pronged lap bar structure are configured to be disposed about an occupant of the seating in the engaged configuration, in a single locking position for one or multiple occupants. The restraint system also includes a tensioner restraint system, which has a strap spanning between the first prong and the second prong of the pronged lap bar structure. The strap is configured to be extendable from a tensioner such that as the first prong and the second prong of the lap bar structure are positioned about the occupant in the engaged configuration of the lap bar assembly, the strap extends from the tensioner to conform about the occupant.

In an embodiment, a ride system having a restraint system for providing dynamically adjustable compliance is provided in accordance with the present disclosure. The ride system includes a ride vehicle having seating to support at least one rider. The ride system also includes a lap bar assembly having a neck and a pronged lap bar structure. The neck is rotatably coupled to the ride vehicle via a pivot at a first end of the neck and coupled to the pronged lap bar structure at a second end of the neck such that the lap bar assembly is configured to rotate about the pivot between an open configuration and an engaged configuration. A first prong and a second prong of the pronged lap bar structure are configured to be positioned on either side of the at least one rider in the seating when the lap bar assembly is in the engaged configuration. The restraint system also includes a strap spanning between the first prong and the second prong of the pronged lap bar structure. The strap is configured to be extendable from a tensioner such that as the first prong and the second prong of the lap bar structure are positioned about the occupant in the engaged configuration of the lap bar assembly, the strap extends from the tensioner to conform about the occupant.

In an embodiment, a method of operating a restraint system in a ride environment is provided. The method includes conforming a strap about an occupant positioned in seating of a ride vehicle, wherein the strap extends from a tensioner and extends between a first prong and a second prong of a lap bar structure. Further, the method includes detecting a tension level on the strap with a sensor and receiving, at a processor, data indicative of the tension level from the sensor. Additionally, the method includes determining, via the processor, a predefined range for the tension level based on a condition of the occupant, an operating parameter of the ride vehicle, a feature of the environment, or any combination thereof. In response to determining the tension level is not within the predefined range, the method includes adjusting an extended length of the strap from the tensioner to move the tension level within the predefined range. The method also includes sending a notification indicating the tension level is within the predefined range.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
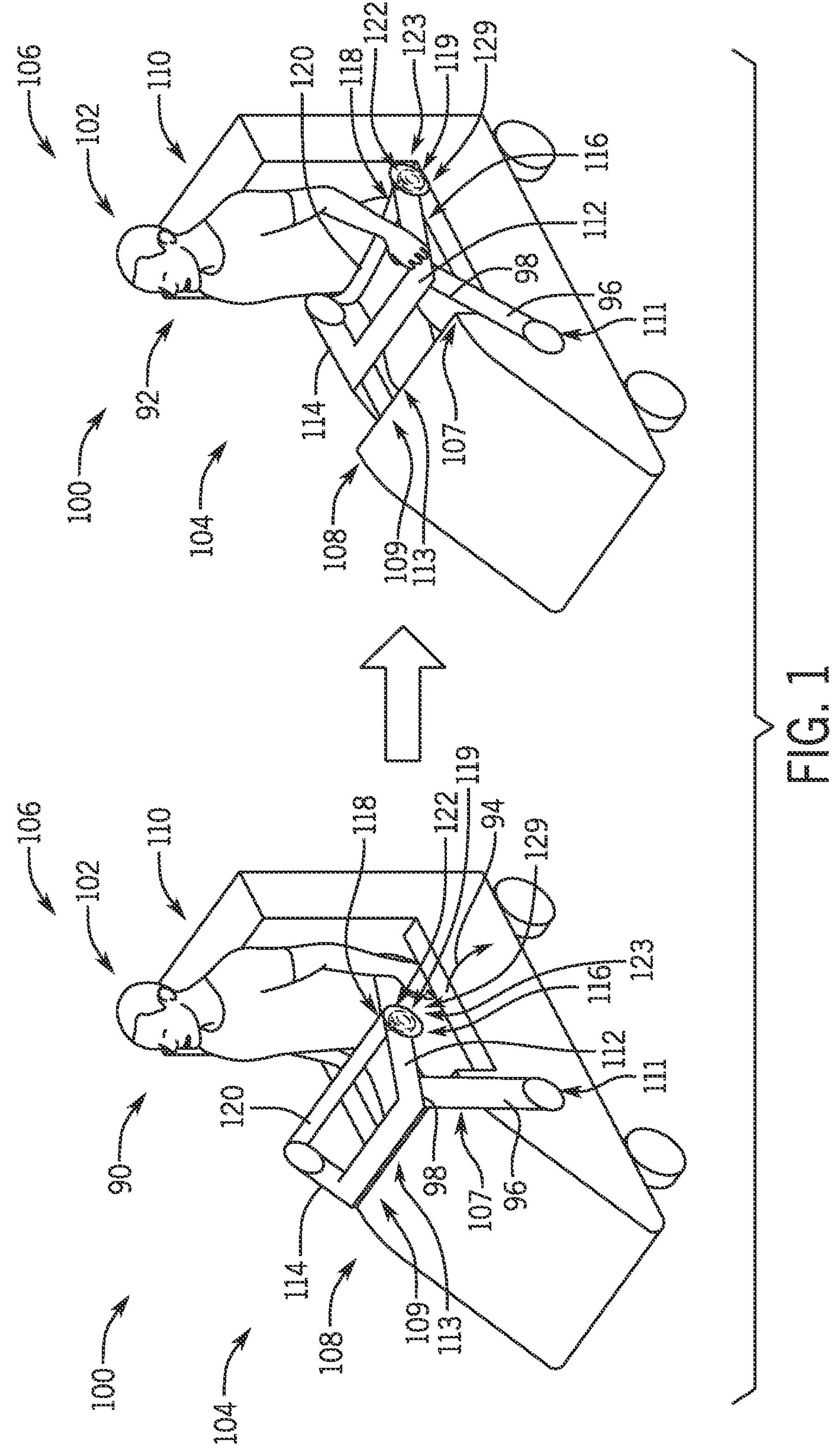
FIG. 1 is a perspective view of an embodiment of a ride system, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection via one or more elements." Further, the term "set" is used to mean "one element" or "more than one element." Further, the terms "couple," "coupling," "coupled," "coupled together," and "coupled with" are used to mean "directly coupled together" or "coupled together via one or more elements."

In addition, as used herein, the terms "real time," "real-time," or "substantially real time" may be used interchangeably and are intended to describe operations (e.g., computing operations) that are performed without any human-perceivable interruption between operations. For example, as used herein, data relating to the systems described herein may be collected, transmitted, and/or used in control computations in "substantially real time," such that data readings, data transfers, and/or data processing steps occur once every second, once every 0.1 second, once every 0.01 second, or even more frequent, during operations of the systems (e.g., while the systems are operating). In addition, as used herein, the terms "continuous," "continuously," or "continually" are intended to describe operations that are performed without any significant interruption. For example, as used herein, control commands may be transmitted to certain equipment every five minutes, every minute, every 30 seconds, every 15 seconds, every 10 seconds, every 5 seconds, or even more often, such that operating parameters of the equipment may be adjusted without any significant interruption to the closed-loop control of the equipment. In addition, as used herein, the terms "automatic," "automated," "autonomous," and so forth, are intended to describe operations that are performed or are caused to be performed, for example, by a computing system (e.g., solely by the computing system, without human intervention). Indeed, although certain operations described herein may not be explicitly described as being performed continuously and/or automatically in substantially real time during operation of the computing system and/or equipment controlled by the computing system, it will be appreciated that these operations may, in fact, be performed continuously and/or automatically in substantially real time during operation of the computing system and/or equipment controlled by the computing system to improve the functionality of the computing system (e.g., by not requiring human intervention, thereby facilitating faster operational decision-making, as well as improving the accuracy of the operational decision-making by, for example, eliminating the potential for human error), as described in greater detail herein.

It has become more common to create environments in amusement parks, which include scenery, special effects, audiovisual features, and other media elements that improve a guest's experience. A ride vehicle may be used to transport a guest (e.g., rider, occupant) in an environment (e.g., a show performance or an attraction), and the guest may be interactive with the environment or have an immersive experience in the environment. Traditionally, a lap bar assembly may be used to secure the guest to the ride vehicle. However, various guests may have various conditions (e.g., height, weight, age, shape, size), and the lap bar assembly may be rigid and not conform to guests based on their various conditions. The guests may require different restraints based on their different conditions. For example, a guest who is larger than an average size of guests (e.g., based on historical data) may require larger and/or longer restraints than a guest who is smaller than the average size of guests, and guests with different body shapes may require different restraints, especially when the ride in the environment includes low minimum height requirements. Accordingly, it is desirable to have a restraint system on the vehicle to provide adjustable compliance for the guests.

As an example of how present embodiments may operate, we shall discuss a scenario in which one or more guests ride on a ride vehicle along a ride path in an environment. A lap bar assembly may traditionally be used to restrain the one or more guests within the ride vehicle. Guests may have different conditions (e.g., height, weight, shape, size), and/or different rides may have different features or properties. For example, some guests may be physically smaller, and/or some rides may include low minimum height requirements (e.g., rides for smaller guests including young children). Accordingly, the lap bar assembly may fit the guests differently. In addition, the ride path may include a number of features such as, but not limited to, tunnels, turns, ascents, descents, loops, and so forth, and different features may require different restraint levels. The lap bar assembly may be designed based on predefined data (e.g., provided by the ride designers) or based on historical data of guests' conditions (e.g., height, weight, shape, size) and may be substantially rigid and not adjustable for guests with conditions different from the predefined data or the historical data. Accordingly, different guests may experience different force (e.g., tension, normal force) and/or pressure caused by the lap bar assembly. For example, some people (e.g., larger individuals) may experience greater force (e.g., tension, normal force) and/or pressure caused by the lap bar assembly compared to others (e.g., smaller individuals) and may feel uncomfortable when restrained by the lap bar assembly in a certain lap bar assembly configuration (e.g., open configuration, close configuration). Therefore, some people may not be able to ride certain rides that have lap bar assemblies designed based on predefined data (e.g., provided by the ride designers) or based on historical data of guests' conditions (e.g., height, weight, shape, size).

In another scenario, a group of guests (e.g., members in a family) with various conditions (e.g., height, weight, shape, size) may ride a multi-rider vehicle in an environment. A common lap bar assembly may be used to restrain the group of guests to the multi-rider vehicle. Due to the various conditions among different guests in the group of guests (e.g., larger guests and smaller guests), the common lap bar assembly may not fit all guests in the group in the same way due to their different conditions, and different guests may experience different force (e.g., tension, normal force) and/or pressure caused by the common lap bar assembly. For example, some people (e.g., larger individuals) may experience greater force (e.g., tension, normal force) and/or pressure caused by the common lap bar assembly compared to others (e.g., smaller individuals).

Present embodiments of the disclosure are directed to systems and methods for securing a rider within a ride vehicle of an amusement park ride using a restraint system having dynamically adjustable compliance that may fit guests with various conditions. For instance, the restraint system may include a tensioner restraint system to provide restraint with adjustable compliance. For example, the tensioner restraint system may include a strap (e.g., a flexible belt, a flexible pad, a series of pads, a cord, a net, parallel cords, and the like) used to restrain a guest to the ride vehicle. The strap may have an adjustable extension length, which may be adjusted based on the tension level on the strap. In accordance with present embodiments, in the above scenarios, guests and/or groups of guests having various conditions (e.g., height, weight, shape, size) may be more consistently and properly restrained by the tensioner restraint system. The tensioner restraint system may provide dynamically adjustable compliance, which is adjustable based on various conditions of the guests and/or different features along the ride path. The tensioner restraint system may also provide adjustable compliance for guests in the same group (e.g., groups including guests of different sizes) using a common restraint assembly.

FIG. 1 is a perspective view of a ride system 100 that has a guest 102 (e.g., rider, occupant) positioned in a ride vehicle 104 in an environment 106. The ride vehicle 104 has a lap bar assembly 108, which may transit between an open configuration 90 and an engaged configuration 92. This transition is illustrated by arrow 94.

The lap bar assembly 108 includes a neck 107 and a pronged lap bar structure 109. The neck 107 is rotatably coupled to the ride vehicle 104 via a pivot 111 at a first end 96 of the neck 107 and coupled to the pronged lap bar structure 109 at a second end 98 of the neck 107. Thus, the lap bar assembly 108 is operable to rotate about the pivot 111 between the open configuration 90 and an engaged configuration 92. In the open configuration 90, the lap bar assembly 108 is positioned further away from seating 110 of the ride vehicle 104 to allow loading the guest 102 into the seating 110 of the ride vehicle 104 or unloading the guest 102 from the seating 110 of the ride vehicle 104. In the engaged configuration 92, the lap bar assembly 108 is positioned closer to the seating 110 of the ride vehicle 104 to restrain the guest 102 with respect to the ride vehicle 104. The lap bar assembly 108 may include one or more prongs 113. The placement, size, and/or orientation of the one or more prongs 113 may vary based on one or more containment requirements. In the embodiment illustrated in FIG. 1, the prongs 113 may include a first prong 112 and a second prong 114, and the first prong 112 and the second prong 114 are disposed about the guest 102 when the lap bar assembly 108 is in the engaged configuration 92.

A tensioner restraint system 116 is incorporated with the lap bar assembly 108 to provide adjustable restraint for the guest 102. For instance, the tensioner restraint system 116 includes a strap 118 (e.g., a flexible belt, a flexible pad, a series of pads, a cord, a net, parallel cords, and the like), and a first portion 120 of the strap 118 spans between the first prong 112 and the second prong 114 of the pronged lap bar structure 109. The tensioner restraint system 116 may also include a tensioner 122, and the strap 118 is extendable from the tensioner 122 and has an adjustable extension length. The tensioner 122 may have an elastic coupler 123 to secure the strap 118 to the lap bar assembly 108. For example, the tensioner 122 may have a spool assembly 119, and a portion of the strap 118 may be wrapped around the spool assembly 119. The tensioner 122 may store a portion of the strap 118 (e.g., a portion of the strap 118 may be wrapped around the spool assembly 119) and may have a tension management system 129 (e.g. a biasing feature) to pull the strap 118 back to the tensioner 122 or release the strap 118 from the tensioner 122. When the tensioner restraint system 116 is not engaged with the guest 102, as in the open configuration 90, the strap 118 may be essentially taut between the first prong 112 and the second prong 114. As the lap bar assembly 108 is transitioned into the engaged configuration 92, the strap 118 may wrap at least partially over and/or around the guest 102 and/or may extend from the tensioner restraint system 116 to conform to the guest 102, such that the first portion 120 is longer. This dynamic aspect of the lap bar assembly 108 (in particular the tensioner restraint system 116), in accordance with present embodiments, facilitates provision of a desired amount of engagement for any of various different body types of the guest 102.

Figure 2:
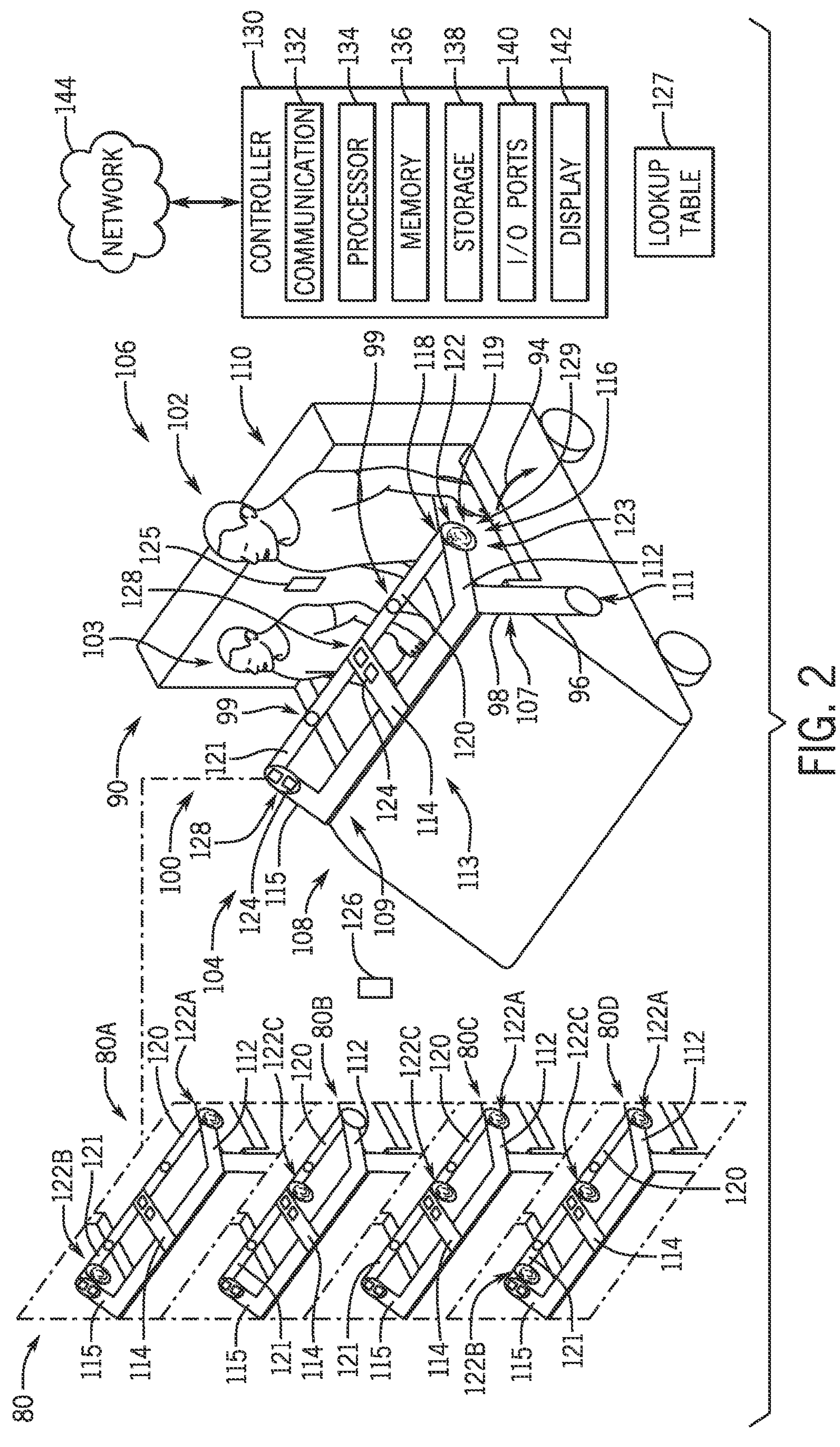
FIG. 2 is a perspective view of an embodiment of the ride system in an open configuration, in accordance with an embodiment of the present disclosure.

FIG. 2 is a perspective view of an embodiment of the ride system 100. In the illustrated embodiment, the seating 110 includes multiple seats. In this embodiment, the guest 102 (e.g., an adult) and an additional guest 103 (e.g., a child or other guest relatively smaller in size in comparison with guest 102) are depicted as sitting in the ride vehicle 104 in the environment 106. The ride vehicle 104 has the lap bar assembly 108, which is depicted in the open configuration 90. The lap bar assembly 108 includes the neck 107 and the pronged lap bar structure 109. The neck 107 is rotatably coupled to the ride vehicle 104 via the pivot 111 at the first end 96 of the neck 107 and coupled to the pronged lap bar structure 109 at the second end 98 of the neck 107 such that the lap bar assembly is configured to rotate about the pivot 111 between the open configuration 90 and the engaged configuration 92. As previously noted, in the open configuration 90, the lap bar assembly 108 is positioned further away from the seating 110 than in the engaged configuration 92. In the engaged configuration 92, the lap bar assembly 108 restrains the guest 102. As in the embodiment illustrated by FIG. 2, the prongs 113 may include more than two prongs. For example, the prongs 113 may include the first prong 112, the second prong 114, and a third prong 115, and two prongs (e.g., the first prong 112 and the second prong 114) are disposed about the guest 102 when the lap bar assembly 108 is in the engaged configuration. The other combination of prongs (e.g., the second prong 114 and the third prong 115) may be disposed about the additional guest 103 in an adjacent portion of the seating 110. The placement, size, and/or orientation of the prongs 113 may vary based on one or more containment requirements.

The tensioner restraint system 116 may be installed on the vehicle 104 to work together with the lap bar assembly 108 to provide an adjustable restraint for the guest 102. For instance, the tensioner restraint system 116 may include a single strap 118 (e.g., a flexible belt, a flexible pad, a series of pads, a cord, a net, parallel cords, and the like) or multiple straps 118. The first portion 120 of the strap 118 may span between the first prong 112 and the second prong 114 of the lap bar assembly 108. The strap 118 may be extended from the tensioner 122 (e.g. the spool assembly 119) and may have an adjustable extension length. The tensioner 122 may use the elastic coupler 123 for securing the strap 118 to the lap bar assembly 108. The tensioner 122 may be installed inside the lap bar assembly 108 (e.g. inside the first prong 112 or the second prong 114). The tensioner 122 may store a portion of the strap 118 (e.g., a portion of the strap 118 may be wrapped around the spool assembly 119) and may use the tension management system 129 (e.g. a biasing feature) to pull the strap 118 back to the tensioner 122 or release the strap 118 from the tensioner 122. There may be a second portion 121 of the strap 118 that spans between the second prong 114 and the third prong 115 of the lap bar assembly 108 and may be pulled back to the tensioner 122.

It should be noted that, although the first portion 120 and the second portion 121 may be extended from the same tensioner 122 and may be components of the same strap 118 in an embodiment of the present disclosure, in other embodiments, as illustrated in a diagram 80 in FIG. 2, such features may be extended from different tensioners and/or may be components of different straps. The diagram 80 shows different embodiments of the lap bar assembly 108 in diagrams 80A, 80B, 80C, and 80D. For example, in the diagram 80A, two tensioners may be used in the lap bar assembly 108, with a first tensioner 122A installed at the first prong 112 and a second tensioner 122B installed at the third prong 115. In the diagram 80A, the first portion 120 may be extended from the first tensioner 122A, and the second portion 121 may be extended from the second tensioner 122B, and the first portion 120 and the second portion 121 may be components of different straps. In the diagram 80B, a third tensioner 122C may be used in the lap bar assembly 108 and installed at the second prong 114, and the first portion 120 and the second portion 121 may be extended from the tensioner 122C. In the diagram 80C, two tensioners may be used in the lap bar assembly 108, with the first tensioner 122A installed at the first prong 112 and the third tensioner 122C installed at the third prong 115. In the diagram 80C, the first portion 120 may be extended from the first tensioner 122A, and the second portion 121 may be extended form the third tensioner 122C, and the first portion 120 and the second portion 121 may be components of different straps. In the diagram 80D, three tensioners may be used in the lap bar assembly 108, with the first tensioner 122A installed at the first prong 112, the second tensioner 122B installed at the third prong 115, and the third tensioner 122C installed at the second prong 114. In the diagram 80D, the first portion 120 may be extended from the first tensioner 122A and/or the third tensioner 122C, and the second portion 121 may be extended from the second tensioner 122B and/or the third tensioner 122C (e.g., both the second tensioner 122B and the third tensioner 122C may control the second portion 121 so that the second portion 121 may have extended length), and the first portion 120 and the second portion 121 may be components of different straps.

It should also be noted that, although three prongs (e.g., the first prong 112, the second prong 114, the third prong 115) are illustrated in FIG. 1, the lap bar assembly 108 may have more than three prongs. Although FIG. 2 illustrates that two guests are restrained by the common lap bar assembly 108 and the tensioner restraint system 116, in other embodiments, fewer than two or more than two guests may be restrained by the lap bar assembly 108 and the tensioner restraint system 116 (or multiple lap bar assemblies 108 and tensioner restraint systems 116).

In an embodiment, one or more sensors 99 (e.g., a force or torque sensor, a pressure sensor, a touch sensor, a resistance sensor, a voltage sensor, a current sensor) may be used to monitor a normal force level on each portion (e.g., the first portion 120, the second portion 121) of the strap 118, and the tensioner restraint system 116 may utilize the force level measured by the one or more sensors 99 to control the operation of the tensioner 122. For example, when the lap bar assembly 108 is in the engaged configuration, the portion 120 of the strap 118 spanning between the first prong 112 and the second prong 114 of the lap bar assembly 108 wraps over the guest 102 to provide an adjustable restraint to the guest 102. Depending on the guest's condition (e.g., height, weight, shape, size), the force level on the first portion 120 of the strap 118 could vary. For example, when the exposed length of the first portion 120 of the strap 118 (e.g., as it is before the lap bar assembly transits to the engaged configuration) is not sufficient to wrap around the guest 102 without applying a pressure with more than a threshold value to the guest 102, the first portion 120 of the strap 118 may need to stretch or extend (e.g., from a biased spool) in order to conform around the guest 102. A relatively consistent pressure may be applied by using a biased spooling mechanism or an ever increasing pressure application may also be employed. For example, an elastic version of the strap 118 or a calibrated version of the tensioner 122 may gradually increase applied force as the strap 118 is extended (e.g., stretched or unspooled). Pressure, for example, may be measured directly (e.g., by a pressure sensor) or based on an amount of extension of the strap 118. The one or more sensors 99 may measure the force level on the first portion 120, and the tensioner restraint system 116 may adjust the length of the first portion 120 of the strap 118 based on the value of the force level on the first portion 120. When the force level on the first portion 120 is greater than a predefined maximum value (e.g., provided by the ride designer or determined based on historical data), the first portion 120 of the strap 118 may extend from the tensioner 122 to reduce the force level to be equal to or smaller than the predefined maximum value. Accordingly, the corresponding force applied to the guest 102 by the first portion 120 may be controlled to be lesser than a value corresponding to the predefined maximum value of the force level on the first portion 120. When the existing length of the first portion 120 of the strap 118 before the lap bar assembly transits to the engaged configuration is at a length so that, when wrapping around the guest 102, the force level on the first portion 120 of the strap 118 has a value less than a predefined minimum value (e.g., provided by the ride designer or determined based on historical data), the first portion 120 of the strap 118 may be withdrawn to the tensioner 122 by the biasing feature of the tensioner 122 to increase the force level to be equal to or greater than the predefined minimum value. Accordingly, the corresponding force applied to the guest 102 by the first portion 120 may be controlled to be greater than a value corresponding to the predefined minimum value of the force level on the first portion 120. The predefined range (e.g., between the predefined minimum value and the predefined maximum value) of the force level may be associated with the condition of the guest 102, a property of the ride system 100 (e.g., configuration of the vehicle 104), an operating parameter of the ride vehicle 104 (e.g., velocity, acceleration, moving direction), a feature of the environment 106, or any combination thereof. When the force level on the strap 118 cannot be adjusted to be within the predefined range of the force level (e.g., lower than a threshold value or higher than a threshold level), the tensioner restraint system 116 may output an alert. For example, when the guest is of a certain shape so that, even with the maximum length of the first portion 120 extended from the tensioner 122, the force level on the first portion 120 may not be adjusted to be equal to or smaller than the predefined maximum value, then the tensioner restraint system 116 may output an alert (e.g., to the operator) to indicate the situation. In another example, when the guest is of a particular size or shape so that, even with the maximum length of the first portion 120 withdrawn to the tensioner 122, the force level on the first portion 120 may not be adjusted to be greater than the predefined minimum value, then the tensioner restraint system 116 may output an alert (e.g., to the operator) to indicate the situation. The working mechanism is similar for adjusting the force level on the second portion 121 of the strap 118. Based on corresponding guest's (e.g., the guest 103) condition, the force level on the first portion 120 may be different from the force level on the second portion 121. In certain embodiments, the force level on the first portion 120 may be the same as the force level on the second portion 121.

Figure 6:
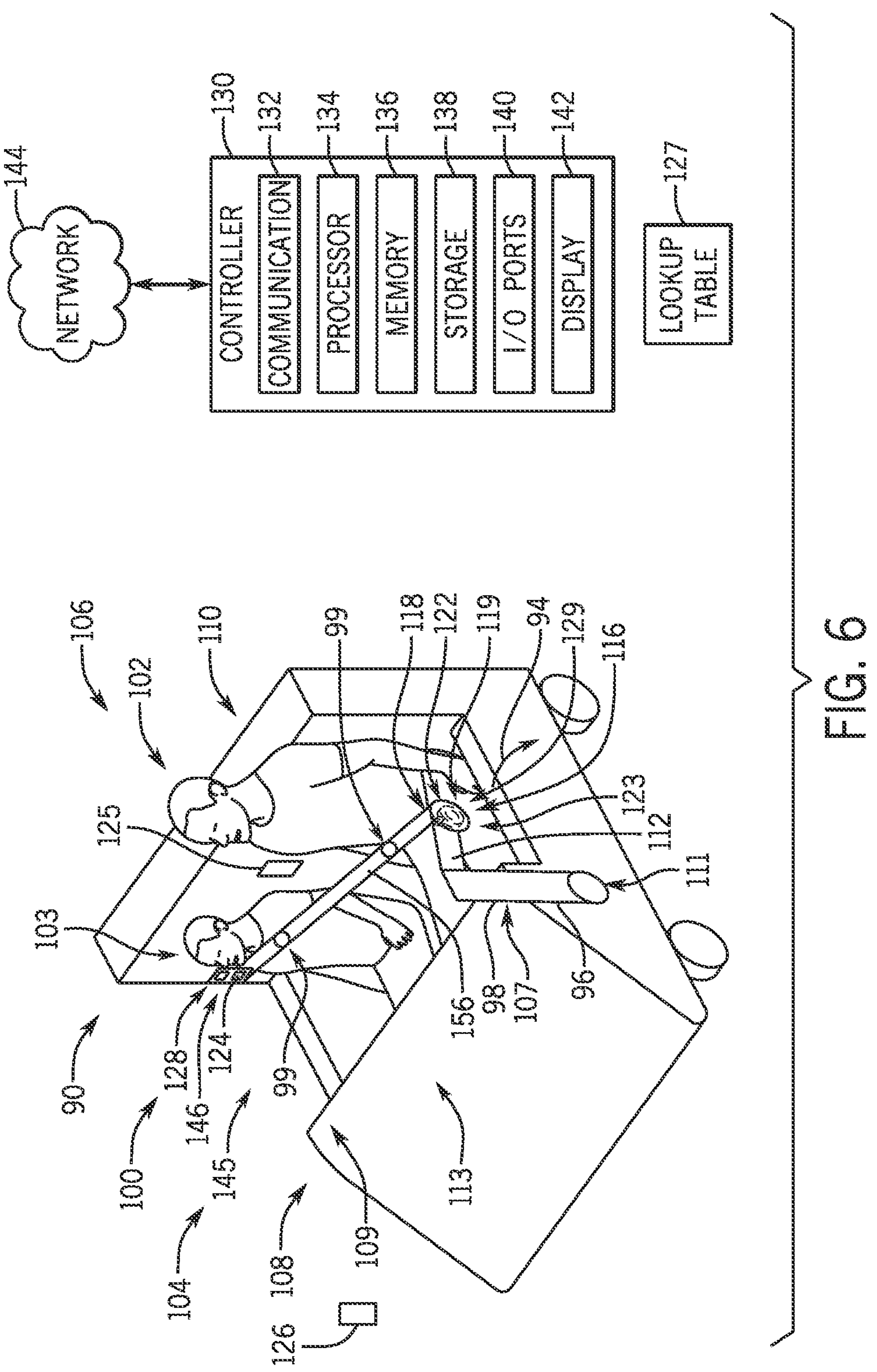
FIG. 6 is a perspective view of an embodiment of the ride system, in accordance with an embodiment of the present disclosure.
Figure 7:
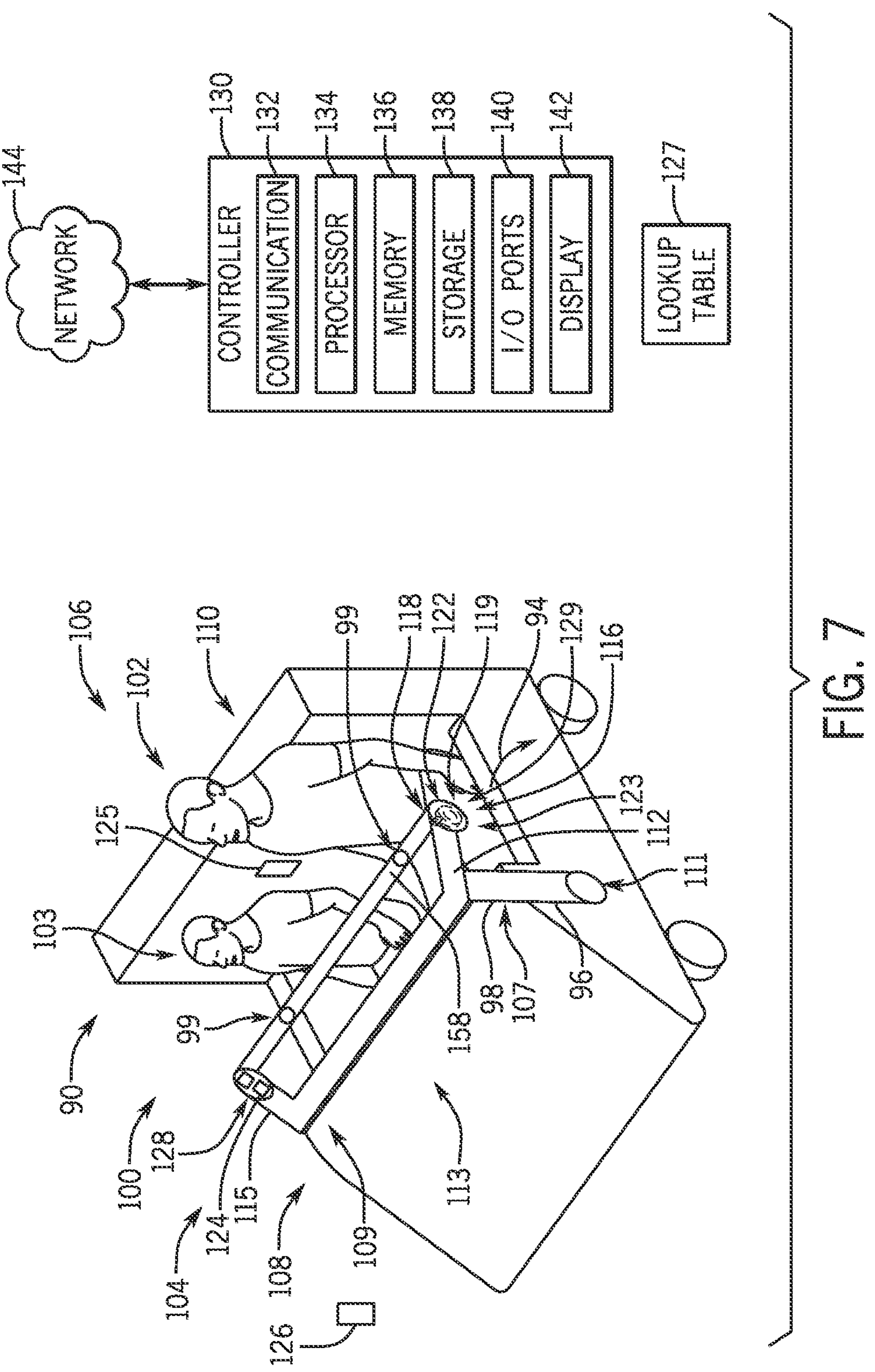
FIG. 7 is a perspective view of an embodiment of the ride system, in accordance with an embodiment of the present disclosure.

In an embodiment, one or more sensors 124 (e.g., a force or torque sensor, a touch sensor, resistance sensor, voltage sensor, current sensor) may be used to monitor a tension level on each portion (e.g., the first portion 120, the second portion 121) of the strap 118, and the tensioner restraint system 116 may utilize the tension level measured by the one or more sensors 124 to control the operation of the tensioner 122. For example, when the lap bar assembly 108 is in the engaged configuration, the portion 120 of the strap 118 spanning between the first prong 112 and the second prong 114 of the lap bar assembly 108 may wrap at least partially over and/or around the guest 102 to provide an adjustable restraint to the guest 102. Depending on the guest's condition (e.g., height, weight, shape, size), the tension level on the first portion 120 of the strap 118 could vary. For example, when the existing length of the first portion 120 of the strap 118 before the lap bar assembly transits to the engaged configuration is not sufficient to wrap around the guest 102 without applying any tension to the first portion 120, the first portion 120 of the strap 118 may need to stretch in order to conform around the guest 102. Under the above situation, the tension level on the first portion 120 of the strap 118 has a nonzero value. The one or more sensors 124 measure the tension level on the first portion 120, and the tensioner restraint system 116 adjusts the length of the first portion 120 of the strap 118 based on the value of the tension level on the first portion 120. When the tension level on the first portion 120 is greater than a predefined maximum value (e.g., provided by the ride designer or determined based on historical data), the first portion 120 of the strap 118 may extend from the tensioner 122 to reduce the tension level to be equal to or smaller than the predefined maximum value. When the existing length of the first portion 120 of the strap 118 before the lap bar assembly transits to the engaged configuration is at a length so that, when wrapping around the guest 102, the tension level on the first portion 120 of the strap 118 has a value less than a predefined minimum value (e.g., provided by the ride designer or determined based on historical data), the first portion 120 of the strap 118 may be withdrawn to the tensioner 122 by the biasing feature of the tensioner 122 to increase the tension level to be equal to or greater than the predefined minimum value. The predefined range (e.g., between the predefined minimum value and the predefined maximum value) of the tension level may be associated with the condition of the guest 102, a property of the ride system 100 (e.g., configuration of the vehicle 104), an operating parameter of the ride vehicle 104 (e.g., velocity, acceleration, moving direction), a feature of the environment 106, or any combination thereof. When the tension level on the strap 118 cannot be adjusted to be within the predefined range of the tension level (e.g., lower than a threshold value or higher than a threshold level), the tensioner restraint system 116 may output an alert. For example, when the guest is of a size so that, even with the maximum extendable length of the first portion 120 extended from the tensioner 122, the tension level on the first portion 120 may not be adjusted to be equal to or smaller than the predefined maximum value, then the tensioner restraint system 116 may output an alert (e.g., to the operator) to indicate the situation. In another example, when the guest is of a size so that, even with the maximum extendable length of the first portion 120 withdrawn to the tensioner 122, the tension level on the first portion 120 may not be adjusted to be greater than the predefined minimum value, then the tensioner restraint system 116 may output an alert (e.g., to the operator) to indicate the situation. The working mechanism is similar for adjusting the tension level on the second portion 121 of the strap 118. Based on various guest conditions, the tension level on the first portion 120 may be different from the tension level on the second portion 121, as illustrated in FIGS. 2-5. In certain embodiments, the tension level on the first portion 120 may be the same as the tension level on the second portion 121, as illustrated in FIGS. 6-7.

In an embodiment, the ride vehicle 104 may have a guest condition sensor 125 (e.g., a weight sensor, a force or torque sensor, a motion sensor, an image sensor, a touch sensor) used to measure the guest's condition (e.g., physical conditions, height, weight, shape, size). The tension levels on different portions of the strap 118 may be adjusted according to the conditions of the corresponding guests. For example, a first guest may receive a different tension level than a second guest who has a different size than the first guest. Accordingly, the tensioner restraint system 116 may provide adjustable restraint, which may be adjustable based on the conditions of the guests.

In an embodiment, the ride system 100 may have operating sensors 126 used to monitor operating parameters of the ride vehicle 104 (e.g., velocity, acceleration, moving direction) in the environment 106. The operating sensors 126 may be displaced on the vehicle 104 or in the environment 106. The tension levels on the strap 118 may be adjusted according to the operating situation of the ride vehicle 104. For example, when the ride vehicle 104 stops or moves with a speed lower than a predefined minimum value (e.g., associated with the environment 106), the tension level on the strap 118 may be adjusted to be within a predefined range for slow motions. When the ride vehicle 104 moves or accelerates with a speed or acceleration greater than a predefined maximum value (e.g., associated with the environment 106), the tension level on the strap 118 may be adjusted to be within a predefined range for faster motions. Depending on the ride system 100, the ride vehicle 104, the environment 106, the condition of the guest 102, and the like, the predefined range for slow motions and the predefined range for faster motions may be essentially the same, or different, or different with overlapping values.

In an embodiment, the predefined range (e.g., between the predefined minimum value and the predefined maximum value) of the tension level together with the corresponding weight of the guest 102, the corresponding size of the guest 102, the corresponding property of the ride system 100, the corresponding operating parameters of the ride vehicle 104, and/or the corresponding feature of the environment 106 may be stored in a lookup table 127 associated with the ride system 100.

In an embodiment, the tensioner restraint system 116 may include a lock system 128 to lock the strap 118 in place. For example, the lock system 128 may lock the first portion 120 of the strap 118 at a desired extension length spanning between the first prong 112 and the second prong 114 of the lap bar assembly 108. For example, after the extended length of the first portion 120 of the strap 118 is adjusted by the tensioner restraint system 116 to be within the predefined range when the lap bar assembly is in the engaged configuration, the lock system 128 may be activated automatically (e.g., based on the tension level on the first portion 120) or by an operator so that the length of the first portion 120 of the strap 118 may not be adjusted until the lock system 128 is deactivated (e.g., automatically or by the operator). The lock system 128 may operate such that the guest 102 is prevented from adjusting the length of the first portion 120 of the strap 118 after the lock system 128 is activated. For example, the lock system 128 may require a key for operation. The lock system 128 may be deactivated automatically (e.g., when receiving a signal) or by the operator. For example, the lock system 128 may be deactivated when the tension level on the strap 118 needs to be adjusted based on sensor feedback or the like. The lock system 128 may also be deactivated at some special events when the guest 102 needs to get off the vehicle 104, such as when an obstacle (e.g., something detected on ride tracks or an attraction route) occurs in the environment 106 or at some special attractions/shows. The operator may deactivate the lock system 128 when deemed suitable or necessary, such as when the guest 102 wants to get off the ride vehicle 104 and the situation allows. The lock system 128 may be deactivated before the ride vehicle 104 finishes riding in the environment 106, and the tension level on the strap 118 may be dynamically adjusted based on various features in the environment 106. Other portions of the strap 118 (e.g., the second portion 121) may also be locked after the length of the corresponding portions are adjusted by the tensioner restraint system 116 to be within a desired (e.g., predefined) range. The lock system 128 may be activated to lock the respective length of each portion of the strap 118 simultaneously, or lock corresponding lengths of at least two portions of the strap 118 independently (e.g., for ride vehicles equipped with more than one tensioner).

A controller 130 may be used to receive and analyze data from the one or more sensors 124. For example, the controller 130 may be used to instruct adjustment of the tension level on the first portion 120 of the strap 118 based on the data received from the one or more sensors 124. The controller 130 may also be used to activate/deactivate the lock system 128. The controller 130 may include various types of components that may assist the controller 130 in performing various types of computer tasks and operations. For example, the controller 130 may include a communication component 132, a processor 134, a memory 136, a storage 138, input/output (I/O) ports 140, a display 142, and the like.

The communication component 132 may be a wireless or wired communication component that may facilitate communication between the controller 130 and various other controllers and devices via a network, the internet, or the like. For example, the communication component 132 may include a transceiver, a receiver, and/or a transmitter to facilitate communications to and/or from the controller 130. For example, the communication component 132 may allow the controller 130 to obtain data from various data sources. The communication component 132 may use a variety of communication protocols, such as Open Database Connectivity (ODBC), TCP/IP Protocol, Distributed Relational Database Architecture (DRDA) protocol, Database Change Protocol (DCP), HTTP protocol, other suitable current or future protocols, or combinations thereof. Additionally, in one embodiment, the communication component 132 may be offboard from the controller (e.g., a wireless communication component).

The processor 134 may process instructions for execution within the controller 130. The processor 134 may include single-threaded processor(s), multi-threaded processor(s), or both. The processor 134 may process instructions stored in the memory 136. The processor 134 may also include hardware-based processor(s), each including one or more cores. The processor 134 may include general purpose processor(s), special purpose processor(s), or both. The processor 134 may be communicatively coupled to other internal components (such as the communication component 132, the storage 138, the I/O ports 140, and the display 142).

The memory 136 and the storage 138 may be any suitable articles of manufacture that can serve as media to store processor-executable code, data, or the like. These articles of manufacture may represent computer-readable media (e.g., any suitable form of memory or storage) that may store the processor-executable code used by the processor 134 to perform the presently disclosed techniques. As used herein, applications may include any suitable computer software or program that may be installed onto the controller 130 and executed by the processor 134. The memory 136 and the storage 138 may represent non-transitory computer-readable media (e.g., any suitable form of memory or storage) that may store the processor-executable code used by the processor 134 to perform various techniques described herein. It should be noted that non-transitory merely indicates that the media is tangible and not a signal. For instance, the lookup table 127 may be stored in the memory 136 and/or the storage 138.

The I/O ports 140 may be interfaces that may couple to other peripheral components such as input devices (e.g., keyboard, mouse, joystick), sensors, input/output (I/O) modules, and the like. The display 142 may operate as a human machine interface (HMI) to depict visualizations associated with software or executable code being processed by the processor 134. In one embodiment, the display 142 may be a touch display capable of receiving inputs from an operator of the controller 130. The display 142 may be any suitable type of display, such as a liquid crystal display (LCD), plasma display, or an organic light emitting diode (OLED) display, for example. Additionally, in one embodiment, the display 142 may be provided in conjunction with a touch-sensitive mechanism (e.g., a touch screen) that may function as part of a control interface for the controller 130. Additionally, in one embodiment, the display 142 may be off-board from the controller (e.g., a wireless display). It should be noted that the components described above with regard to the controller 130 are examples and the controller 130 may include additional or fewer components relative to the illustrated embodiment.

Further, the ride system 100 may include network features that facilitate data communication within the ride system 100 and with exterior devices. The network may include transceivers, receivers, and/or transmitters to facilitate data communication to and/or from the controller 130. For example, data (e.g., force data, pressure data, size data, image data, video data, sound data, location data, and weight data) collected by sensors (e.g., the one or more sensors 124, the guest condition sensor 125, the operating sensors 126, other sensors on the ride vehicle 104 and/or in the environment 106) may be transmitted to the controller 130 through a network 144. Further, external data (e.g., data about a particular user, local weather/news) may be gathered from a remote system and transmitted to the controller 130 via the network 144. However, in some embodiments, the data collected by sensors may be transmitted directly from the sensors (e.g., the one or more sensors 124) to the controller 130. Indeed, the controller 130 may communicate with the sensors or other devices directly and/or through the network 144 in accordance with present embodiments.

Figure 3:
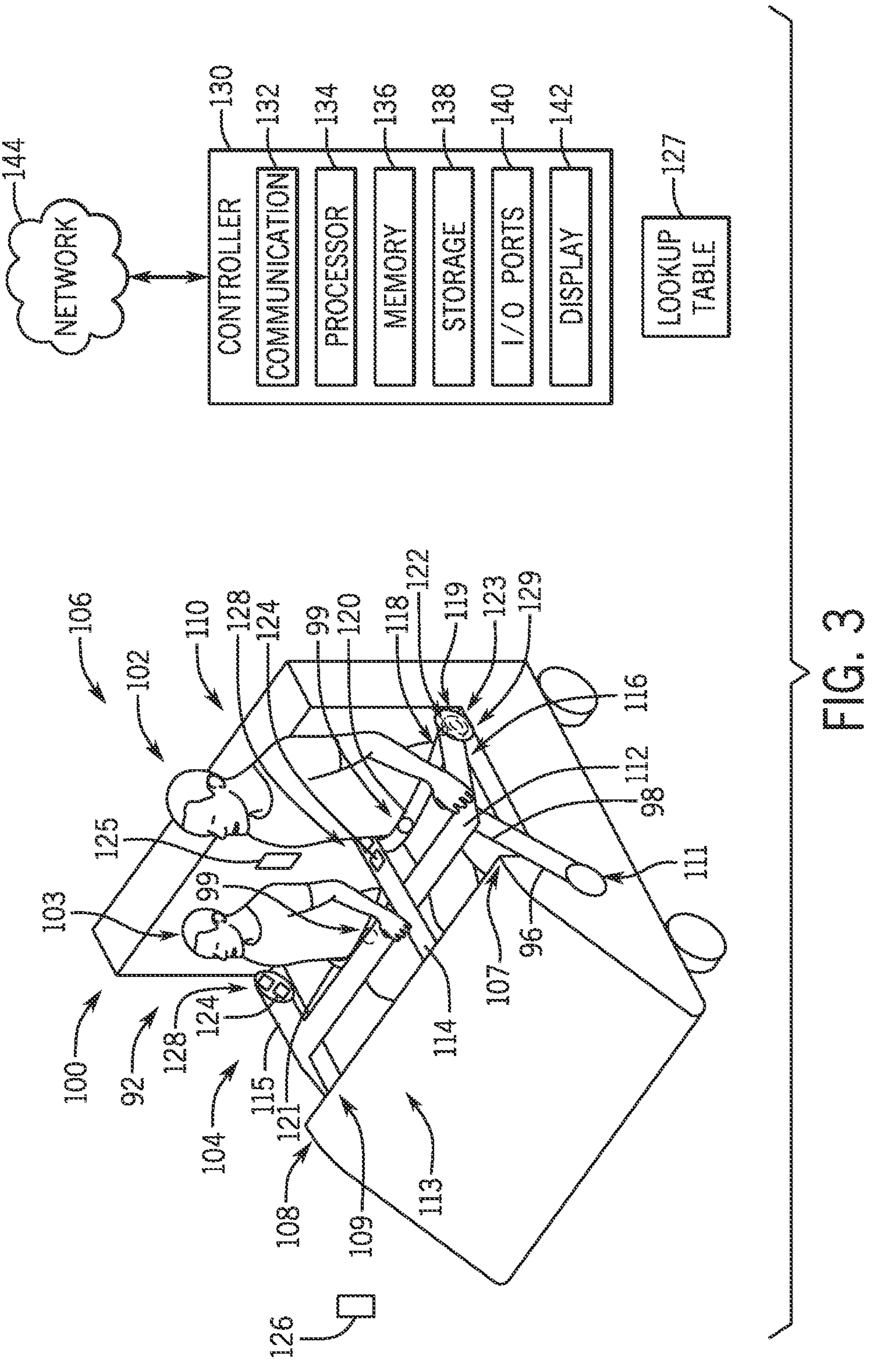
FIG. 3 is a perspective view of the ride system in FIG. 2 in an engaged configuration, in accordance with an embodiment of the present disclosure.

FIG. 3 is a perspective view of the ride system 100 when the lap bar assembly 108 is in the engaged configuration 92. As illustrated in FIG. 3, when the lap bar assembly 108 is in the engaged configuration 92, the strap 118 may wrap at least partially over and/or around the guest 102 and/or the guest 103. Additionally or alternatively, when the lap bar assembly 108 is in the engaged configuration 92, the strap 188 may conform to the guest 102 and/or the guest 103. It should be noted that, although the first portion 120 and the second portion 121 of the strap 118 wrap around the laps of the guests 102 and 103 in the embodiment illustrated in FIG. 2, in other embodiments, the first portion 120 and the second portion 121 of the strap 118 may wrap around other body parts of the guests (e.g., chest, arms, or legs), and/or each portion may wrap around more than one body part of the corresponding guest, as described in FIGS. 4-6. In such embodiments, the lap bar assembly 108 may be replaced with a shoulder or torso bar assembly, which may operate similarly to the configurations of FIG. 1-3 or may translate (e.g., rotate downward from overhead, slidably translate, linearly translate) into the engaged configuration 92.

Figure 4:
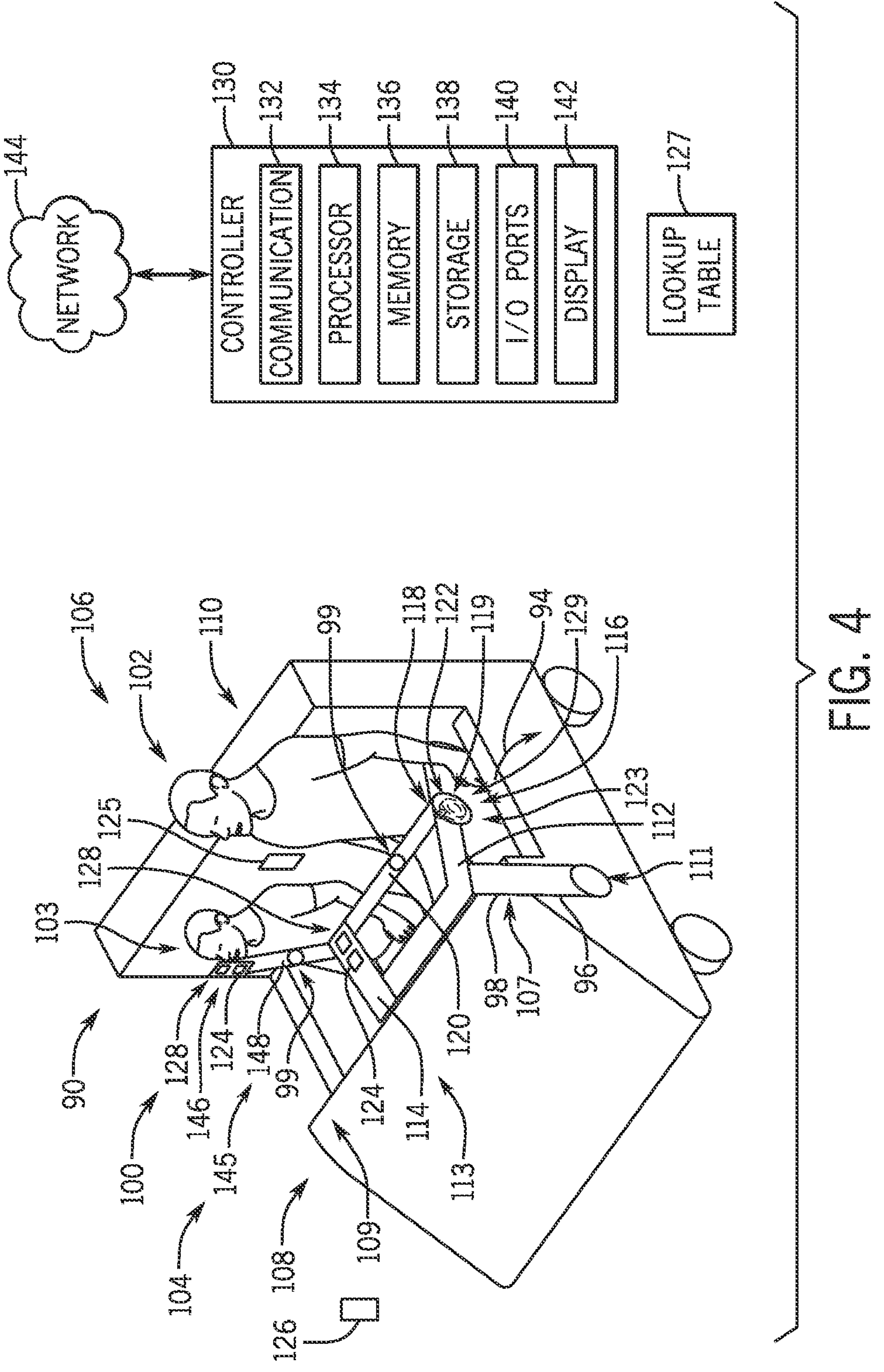
FIG. 4 is a perspective view of an embodiment of the ride system, in accordance with an embodiment of the present disclosure.

FIG. 4 is a perspective view of an embodiment of the ride system 100. In the embodiment illustrated in FIG. 4, the prongs 113 include two prongs: the first prong 112; and the second prong 114. The placement, size, and/or orientation of the prongs 113 may vary based on one or more containment requirements. The first prong 112 and the second prong 114 may be disposed about the guest 102 when the lap bar assembly 108 is in the engaged configuration. The first portion 120 of the strap 118 spans between the prong 112 and the second prong 114 of the lap bar assembly 108 and wraps at least partially around the guest 102 when the lap bar assembly 108 is in the engaged configuration. The strap 118 may be extended from the tensioner 122 (e.g. the spool assembly 119) and may have an adjustable extension length. The tensioner 122 may be installed inside the lap bar assembly 108 (e.g. the first prong 112 or the second prong 114). One end 145 of the strap 118 may be coupled to the seating 110 at a first location 146, and a third portion 148 of the strap 118 may span between the second prong 114 and the first location 146. The third portion 148 may be pulled back to the tensioner 122 (or a separate tensioner 122), which may be installed inside the lap bar assembly 108 (e.g. inside the first prong 112 or the second prong 114) or the seating 110. The third portion 148 may wrap at least partially around certain body parts (e.g., chest, arms, or legs) of the additional guest 103 and may wrap at least partially around more than one body part (e.g., arm and chest) when the lap bar assembly 108 is in the engaged configuration. Accordingly, when the lap bar assembly 108 is in the engaged configuration 92, the strap 118 may wrap at least partially over and/or around the guest 102 and/or the guest 103. Additionally or alternatively, when the lap bar assembly 108 is in the engaged configuration 92, the strap 118 may conform to the guest 102 and/or the guest 103.

Figure 5:
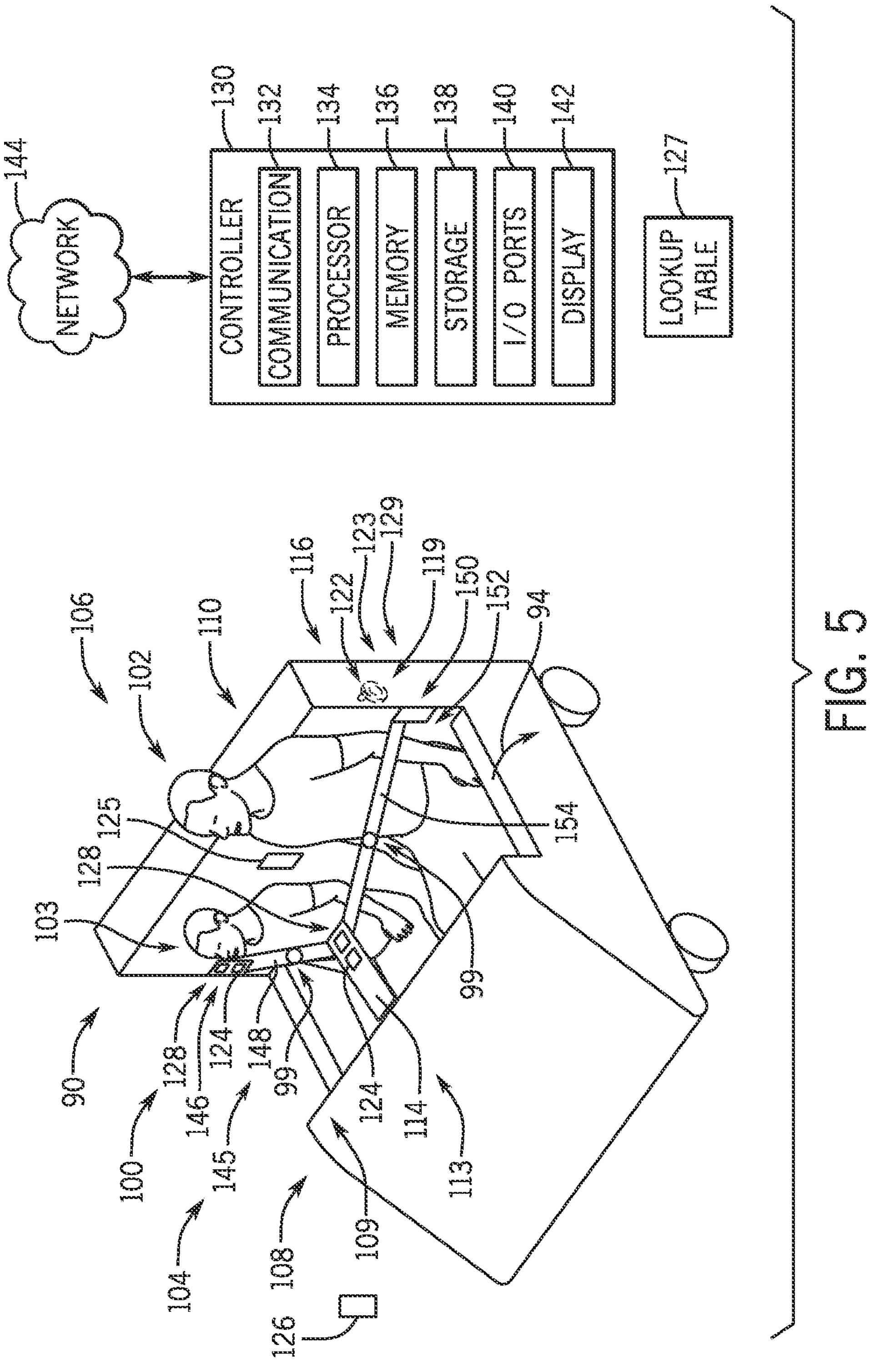
FIG. 5 is a perspective view of an embodiment of the ride system, in accordance with an embodiment of the present disclosure.

FIG. 5 is a perspective view of an embodiment of the ride system 100. In the embodiment illustrated in FIG. 5, the ride system 100 may only include the second prong 114. The second prong 114 may be disposed between the guest 102 and the additional guest 103 when the lap bar assembly 108 is in the engaged configuration. The placement, size and/or orientation of the second prong 114 may vary based on one or more containment requirements. The third portion 148 of the strap 118 may wrap at least partially around certain body parts (e.g., chest, arms, or legs) of the additional guest 103 and may wrap at least partially around more than one body part (e.g., arm and chest) when the lap bar assembly 108 is in the engaged configuration. The third portion 148 may be extended from the tensioner 122 (e.g. the spool assembly 119) and may have an adjustable extension length. The tensioner 122 may be installed inside the seating 110 or inside the second prong 114. One end 150 of the strap 118 may be coupled to the seating 110 at a second location 152, and a fourth portion 154 of the strap 118 may span between the second prong 114 and the second location 152. The fourth portion 154 may wrap at least partially around certain body parts (e.g., chest, arms, or legs) of the guest 102 and may wrap at least partially around more than one body part (e.g., arm and chest) when the lap bar assembly 108 is in the engaged configuration. The fourth portion 154 and/or the third portion 148 may be pulled back to the tensioner 122 or a separate tensioner 122 (e.g., inside the second prong 114 or inside the seating 110). Accordingly, when the lap bar assembly 108 is in the engaged configuration 92, the strap 118 wraps at least partially over and/or around the guest 102 and/or the guest 103. Additionally, or alternatively, when the lap bar assembly 108 is in the engaged configuration 92, the strap 118 may conform to the guest 102 and/or the guest 103.

FIG. 6 is a perspective view of an embodiment of the ride system 100. In the illustrated embodiment, the ride system 100 may only include the first prong 112. The placement, size, and/or orientation of the first prong 112 may vary based on one or more containment requirements. The end 145 of the strap 118 may be coupled to the seating 110 at the first location 146. A fifth portion 156 of the strap 118 may span between the first prong 112 and the first location 146. The fifth portion 156 of the strap 118 may wrap at least partially around certain body parts (e.g., chest, arms, legs) of the guest 102 and the additional guest 103 and may wrap at least partially around more than one body part (e.g., arm and chest) when the lap bar assembly 108 is in the engaged configuration. The strap 118 may be extended from the tensioner 122 (e.g. the spool assembly 119) and may have an adjustable extension length. The tensioner 122 may be installed inside the lap bar assembly 108 (e.g. the first prong 112). Accordingly, when the lap bar assembly 108 is in the engaged configuration 92, the strap 118 wraps at least partially over and/or around the guest 102 and/or the additional guest 103. Additionally or alternatively, when the lap bar assembly 108 is in the engaged configuration, the strap 118 may conform to the guest 102 and/or the additional guest 103. In FIG. 6, the guest 102 and the additional guest 103 may be wrapped at least partially by the same fifth portion 156 of the strap 118. Accordingly, the tension level on the fifth portion 156 is the same for the guest 102 and the additional guest 103. As mentioned previously, the corresponding forces applied to the guest 102 and the additional guest 103 by the fifth portion 156 may be related to the corresponding body shape and/or size of the guest 102 and the additional guest 103, respectively. Therefore, when the body shapes of the guest 102 and the additional guest 103 are different, the corresponding forces applied to the guest 102 and the additional guest 103 by the fifth portion 156 may be different. Accordingly, the tension level on the fifth portion 156 may be adjusted to be in a range suitable for both the guest 102 and the additional guest 103.

FIG. 7 is a perspective view of an embodiment of the ride system 100. In the illustrated embodiment, the prongs 113 includes two prongs, the first prong 112 and the third prong 115. The placement size, and/or orientation of the prongs 113 may vary based on one or more containment requirements. A sixth portion 158 of the strap 118 may span between the first prong 112 and the third prong 115. The sixth portion 158 of the strap 118 may wrap the guest 102 and the additional guest 103 at least partially around certain body parts (e.g., chest, arms, or legs) and may wrap around more than one body part (e.g., arm and chest) when the lap bar assembly 108 is in the engaged configuration. The strap 118 may be extended from the tensioner 122 (e.g., the spool assembly 119) and may have an adjustable extension length. The tensioner 122 may be installed inside the lap bar assembly 108 (e.g., the first prong 112 or the third prong 115). Accordingly, when the lap bar assembly 108 is in the engaged configuration 92, the strap 118 may wrap at least partially over and/or around the guest 102 and/or the additional guest 103. Additionally or alternatively, when the lap bar assembly 108 is in the engaged configuration 92, the strap 188 may conform to the guest 102 and/or the additional guest 103. In FIG. 7, the guest 102 and the additional guest 103 may be at least partially wrapped by the same sixth portion 158 of the strap 118. Accordingly, the tension level on the sixth portion 158 is the same for the guest 102 and the additional guest 103. As mentioned previously, the corresponding forces applied to the guest 102 and the additional guest 103 by the sixth portion 158 may be related to the corresponding body shape and/or size of the guest 102 and the additional guest 103, respectively. Therefore, when the body shapes and/or sizes of the guest 102 and the additional guest 103 are different, the corresponding forces applied to the guest 102 and the additional guest 103 by the sixth portion 158 may be different. Accordingly, the tension level on the sixth portion 158 may be adjusted to be in a range suitable for both the guest 102 and the additional guest 103.

Figure 8:
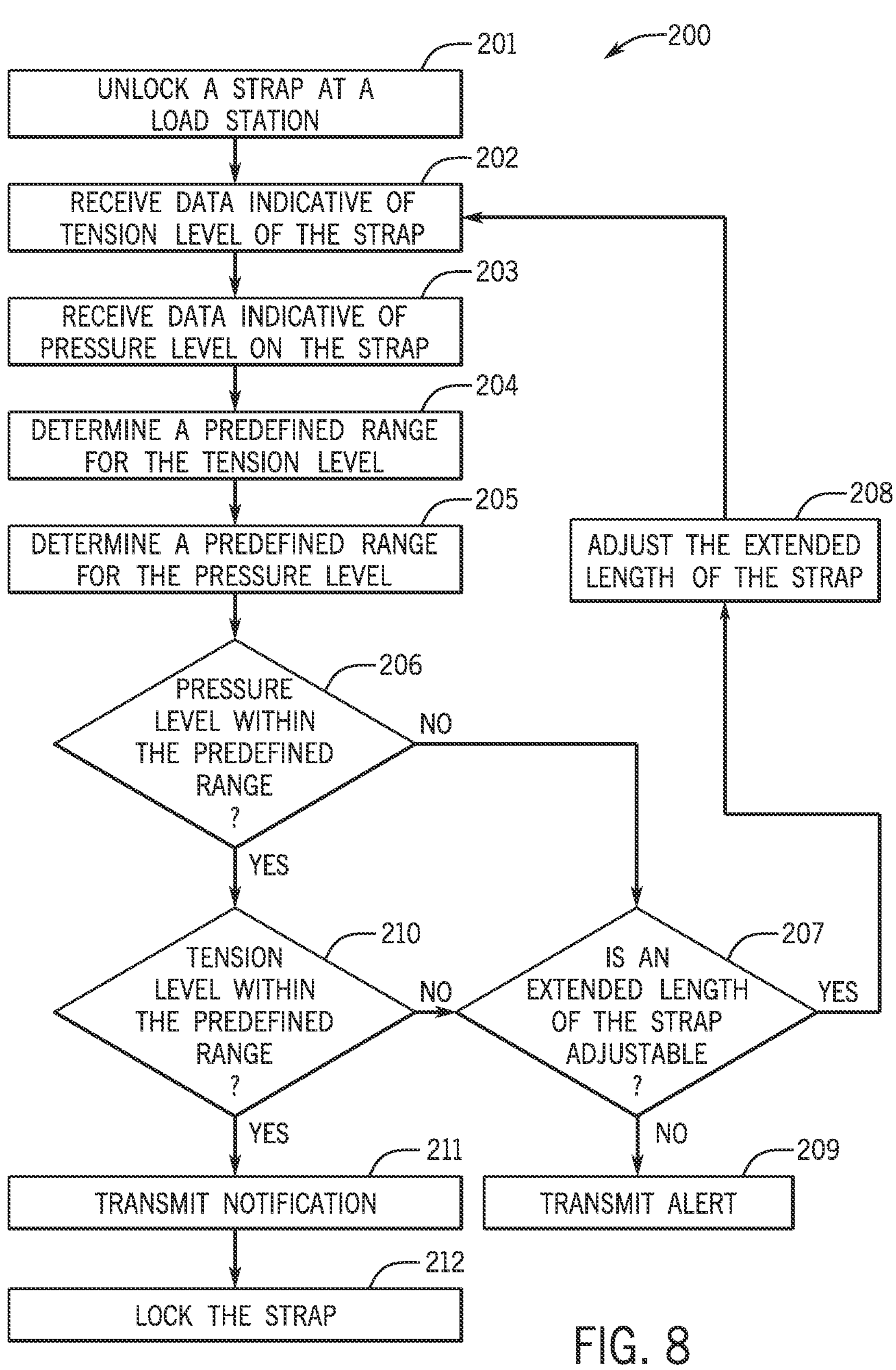
FIG. 8 is a flow diagram of a method for operating a tensioner restraint system in a ride system, in accordance with an embodiment of the present disclosure.

FIG. 8 illustrates a method 200 that may be used to operate the tensioner restraint system 116. At block 201, the strap 118 may be unlocked (e.g., at a load station). At block 202, the controller 130 may receive data indicative of the tension levels of each portion of the strap 118 (e.g., the first portion 120, the second portion 121) from the one or more sensors 124. At block 203, the controller 130 may receive data indicative of measurements for the pressure levels on each portion of the strap 118 (e.g., the first portion 120, the second portion 121) from the one or more sensors 99. The controller may also receive the conditions of the guests (e.g., the guest 102, the additional guest 103) from the guest condition sensors 125 and/or other resources (e.g. the storage 138, databases, external resources), the operating parameters of the vehicle 104 from the operating sensors 126, data associated with the configuration of the vehicle 104 (e.g., from the storage 138, databases, external resources), data associated with the environment 106 (e.g., features in the environment 106, local weather/news), and the like. At block 204, the controller may analyze the data collected in block 202 to determine a corresponding predefined range for the respective tension level on each portion of the strap 118 based on the condition of the corresponding guest, a property of the ride system 100 (e.g., configuration of the vehicle 104), an operating parameter of the ride vehicle 104 (e.g., velocity, acceleration, moving direction), a feature of the environment 106, or any combinations thereof. At block 205, the controller may analyze the data collected in block 203 to determine a corresponding predefined range for the respective pressure level on each portion of the strap 118 based on the condition of the corresponding guest, a property of the ride system 100 (e.g., configuration of the vehicle 104), an operating parameter of the ride vehicle 104 (e.g., velocity, acceleration, moving direction), a feature of the environment 106, or any combinations thereof. The controller 130 may determine the corresponding predefined range for the tension level or pressure level on a portion of the strap 118 by implementing the lookup table 127, or by using a predetermined algorithm. The controller 130 may compare, at block 206, the measured pressure level on each portion of the strap 118 with the corresponding predefined range. If the measured pressure level on a portion of the strap 118 is not within the corresponding predefined range, the controller 130 may determine whether the extended length of the strap 118 may be adjusted at block 207. If the controller 130 determines that the extended length of the strap 118 may be adjusted, the length of the corresponding portion of the strap 118 may be adjusted (e.g., pull from or withdraw to the tensioner 122) at block 208 based on the pressure level measured. If the controller 130 determines that the extended length of the strap 118 may not be adjusted, the controller 130 may transmit an alert at block 209. For example, when the time taken to adjust the extended length of the strap 118 is more than a threshold, the controller 130 may determine that the extended length of the strap 118 may not be adjusted. The controller 130 may compare, at block 210, the measured tension level on each portion of the strap 118 with the corresponding predefined range. If the measured tension level on a portion of the strap 118 is not within the corresponding predefined range, the controller 130 may repeat blocks 202-208. At block 211, when the tension levels and pressure levels on all portions of the strap 118 are adjusted to be within the corresponding predefined ranges, the controller 130 may transmit a notification indicating the status of the tension levels and pressure levels (e.g., to the operator of the ride system), and the lock system 128 may be activated to lock the corresponding length of each portion of the strap 118 at block 212.

It should be noted that reference to “first”, “second”, “third”, “fourth”, “fifth”, and “sixth” with respect to the portions 120, 121, 148, 154, 156, and 158 is merely to facilitate discussion and distinction, but these terms could be interchangeable.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A restraint system for a ride vehicle, the restraint system comprising:

seating of the ride vehicle comprising one or more seats; and a lap bar, wherein the lap bar is configured to transition between an open configuration and an engaged configuration, wherein the lap bar comprises:

one or more prongs configured to be disposed about one or more occupants of the seating of the ride vehicle when the lap bar is in the engaged configuration, wherein the one or more prongs comprise a first prong, a second prong, and a third prong, wherein at least one prong of the one or more prongs comprises a first tensioner, and wherein, in the engaged configuration, the first prong of the one or more prongs and the second prong of the one or more prongs are configured to be disposed at least partially about a first occupant of the one or more occupants of the seating, and the first prong of the one or more prongs and the third prong of the one or more prongs are configured to be disposed about a second occupant of the one or more occupants of the seating; and a restraint comprising one or more straps, wherein the one or more straps conform about at least a portion of each of the one or more occupants with the lap bar in the engaged configuration.

2. The restraint system of claim 1, comprising a first strap of the one or more straps, wherein the first tensioner is:

coupled with the first prong of the one or more prongs and, the first strap of the one or more straps extends from the first prong of the one or more prongs to the second prong; or coupled with the second prong, and the first strap of the one or more straps extends from the second prong to the first prong.

3. The restraint system of claim 2, comprising a second tensioner and a second strap of the one or more straps, wherein the second tensioner is coupled with:

the third prong of the one or more prongs, and the second strap of the one or more straps extends from the second tensioner to the first prong of the one or more prongs.

4. The restraint system of claim 1, wherein the first tensioner is coupled with:

the first prong of the one or more prongs, and a first strap of the one or more straps extends from the first tensioner to the second prong and the third prong of the one or more prongs.

5. The restraint system of claim 1, comprising one or more tensioners including the first tensioner, wherein at least one tensioner of the one or more tensioners comprises:

a spool about which a portion of a respective strap of the one or more straps is wrapped; and a biasing feature configured to pull the respective strap of the one or more straps toward the spool.

6. The restraint system of claim 5, wherein the respective strap of the one or more straps extends from the first tensioner of the one or more tensioners to conform, in the engaged configuration, at least partially about at least a first occupant of the one or more occupants and at least a second occupant of the one or more occupants.

7. The restraint system of claim 1, comprising a single strap that engages each of the first prong of the one or more prongs, the second prong of the one or more prongs, and the third prong of the one or more prongs.

8. The restraint system of claim 1, wherein each of the first prong of the one or more prongs and the second prong of the one or more prongs, comprises a respective tensioner.

9. The restraint system of claim 1, comprising a sensor system configured to detect a tension level of at least one strap of the one or more straps.

10. The restraint system of claim 9, comprising:

one or more tensioners including the first tensioner; and a tension management system configured to control at least one tensioner of the one or more tensioners to adjust an extended length of the at least one strap of the one or more straps based on the tension level of the at least one strap of the one or more straps.

11. The restraint system of claim 9, comprising a lock system configured to lock the at least one strap of the one or more straps into place in response to the tension level of the at least one strap of the one or more straps being within a defined range.

12. The restraint system of claim 11, wherein the defined range is selected based on a weight of at least one occupant of the one or more occupants, a size of the at least one occupant of the one or more occupants, a property of the ride vehicle, an operating parameter of the ride vehicle, a feature in an environment that the ride vehicle rides in, or any combination thereof.

13. The restraint system of claim 12, wherein the defined range is stored in a look-up table with corresponding values of the weight of the at least one occupant of the one or more occupants, the size of the at least one occupant of the one or more occupants, the property of the ride vehicle, the operating parameter of the ride vehicle, the feature in the environment that the ride vehicle rides in, or any combination thereof.

14. The restraint system of claim 11, wherein an extended length of the at least one strap of the one or more straps is not adjustable while it is locked by the lock system.

15. The restraint system of claim 9, wherein the sensor system comprises a weight sensor, a force or torque sensor, a motion sensor, an image sensor, a touch sensor, or any combination thereof.

16. The restraint system of claim 1, comprising an alert system configured to transmit an alert when a tension sensor detects a tension value on at least one strap of the one or more straps that is lower than a threshold value when the lap bar is in the engaged configuration.

17. The restraint system of claim 1, wherein the one or more straps comprises a flexible belt, a flexible pad, a series of pads, a cord, a net, parallel cords, or any combination thereof.

18. A ride system, comprising:

a ride vehicle comprising seating configured to support a plurality of riders; and a lap bar assembly comprising a neck and a pronged lap bar structure, wherein the neck is coupled to the ride vehicle at a first end of the neck and coupled to the pronged lap bar structure at a second end of the neck such that the lap bar assembly is configured to actuate between an open configuration and an engaged configuration, wherein the pronged lap bar structure comprises:

a plurality of prongs configured to be disposed about the plurality of riders when the lap bar assembly is in the engaged configuration, wherein the plurality of prongs comprise a first prong, a second prong, and a third prong, wherein at least one prong of the plurality of prongs comprises a tensioner, and wherein, in the engaged configuration, the first prong and the second prong are configured to be disposed at least partially about a first rider of the plurality of riders, and the first prong and the third prong are configured to be disposed about a second rider of the plurality of riders; and a restraint comprising one or more straps configured to conform about at least a portion of each rider of the plurality of riders with the lap bar assembly in the engaged configuration.

19. The ride system of claim 18, wherein the neck is:

rotatably coupled to the ride vehicle via a pivot at the first end of the neck such that the lap bar assembly is configured to rotate about the pivot between the open configuration and the engaged configuration; or slidably coupled to the ride vehicle at the first end of the neck such that the lap bar assembly is configured to translate between the open configuration and the engaged configuration.

20. The ride system of claim 18, wherein the tensioner comprises an elastic coupler securing the strap to the lap bar assembly.

21. The ride system of claim 18, comprising a sensor system configured to detect a tension level on the one or more straps and a tension management system configured to control the tensioner to adjust an extended length of the one or more straps based on the tension level.

22. A method of operating a restraint system in a ride environment, the method comprising:

conforming a strap at least partially about one or more occupants positioned in seating of a ride vehicle, wherein:

the strap extends from a tensioner and extends between a first prong and a second prong of a lap bar structure; or the strap extends from the tensioner and extends between a first prong and the seating of the ride vehicle;

detecting, with one or more sensors, a force level on the strap;

receiving, at one or more processors, data indicative of the force level from at least one sensor of the one or more sensors;

determining, via at least one processor of the one or more processors, a predefined range for the force level based on a condition of at least one occupant of the one or more occupants, an operating parameter of the ride vehicle, a feature of the ride environment, or any combination thereof;

adjusting, in response to determining the force level is not within the predefined range, an extended length of the strap from the tensioner to adjust the force level to be within the predefined range; and transmitting a notification indicating the force level is within the predefined range.

23. The method of claim 22, wherein the force level comprises a tension level or a pressure level.

24. The method of claim 22, wherein the one or more sensors comprise a torque sensor, a touch sensor, a resistance sensor, a voltage sensor, a current sensor, or any combination thereof.

25. The method of claim 22, wherein the condition is associated with a ride parameter.

26. The method of claim 22, wherein the condition comprises a size of the strap.

27. The method of claim 22, comprising monitoring a time period required to adjust the force level to be within the predefined range.

* * * * *